United States Patent
Borden

(10) Patent No.: US 10,160,370 B2
(45) Date of Patent: Dec. 25, 2018

(54) MOBILE SHOWROOM AND ADVERTISING SYSTEM

(71) Applicant: Aardvark Event Logistics, Huntingdon Valley, PA (US)

(72) Inventor: Lawrence Wayne Borden, Gladwyne, PA (US)

(73) Assignee: Aardvark Event Logistics, Inc., Huntingdon Valley, PA (US)

( * ) Notice: Subject to any disclaimer, the term of this patent is extended or adjusted under 35 U.S.C. 154(b) by 0 days.

(21) Appl. No.: 15/398,506

(22) Filed: Jan. 4, 2017

(65) Prior Publication Data

US 2018/0186272 A1 Jul. 5, 2018

(51) Int. Cl.
*G09F 21/04* (2006.01)
*B60P 3/025* (2006.01)

(52) U.S. Cl.
CPC .......... *B60P 3/0255* (2013.01); *G09F 21/048* (2013.01)

(58) Field of Classification Search
CPC ........ G09F 21/04; G09F 21/00; G09F 21/048; G09F 21/043; G09F 21/045; B60P 3/14; B60P 3/025; B60P 3/0252; B60P 3/0255; B60P 3/0257; B60P 3/34; E04H 1/1222; E04H 1/1272; E04H 2001/1283; E04B 1/344; E04B 1/3444; E04B 1/3442; E04B 1/34336; E04B 1/34357
USPC .. 296/21, 24.33, 24.32, 24.36, 24.39, 26.15; 40/591; 52/79.5, 64, 69, 79.1, 7, 143
See application file for complete search history.

(56) References Cited

U.S. PATENT DOCUMENTS

| 2,733,094 | A | | 1/1956 | Carlton |
| 3,258,019 | A | * | 6/1966 | Bellas ........................ B60S 3/04 |
| | | | | 134/123 |
| 3,308,845 | A | * | 3/1967 | Bellas ........................ B60P 3/14 |
| | | | | 137/234.6 |
| 3,338,423 | A | * | 8/1967 | Wellman, Jr. .......... A47B 57/50 |
| | | | | 211/162 |
| 3,492,042 | A | | 1/1970 | Nachtigall, Jr. |
| 3,534,997 | A | | 10/1970 | Mitchell, Jr. |
| 3,620,564 | A | * | 11/1971 | Wenger ................. B60P 3/0252 |
| | | | | 160/19 |
| D230,351 | S | | 2/1974 | Hamel |

(Continued)

FOREIGN PATENT DOCUMENTS

| DE | 3446490 A1 | * | 9/1985 | ............ B60P 3/0257 |
| DE | 19541655 A1 | * | 5/1996 | ............ B65D 88/127 |

(Continued)

OTHER PUBLICATIONS

Machine Translation of KR10-2016-0115172, Jun. 14, 2017, http://engpat.kipris.or.kr/pmt/patent/patentRTT.jsp.*

(Continued)

*Primary Examiner* — Ryan D Kwiecinski
(74) *Attorney, Agent, or Firm* — Blank Rome LLP

(57) ABSTRACT

A mobile truck body has a first panel extending forward from the front of a right side truck body panel and a second panel extending rearward from the rear of the right side truck body panel. The first and second panels extend the display area of the right side truck body panel. An upper panel and a lower panel are also provided at the right side truck body panel to provide access to an interior space of the truck body for showcasing products or services.

15 Claims, 7 Drawing Sheets

(56) References Cited

U.S. PATENT DOCUMENTS

| | | | |
|---|---|---|---|
| 4,019,773 A * | 4/1977 | Vehling | B60P 3/0255 296/21 |
| D247,290 S | 2/1978 | Arnot, Jr. | |
| 4,232,488 A | 11/1980 | Hanley | |
| 4,601,509 A | 7/1986 | Ellis, Sr. | |
| D300,012 S | 2/1989 | Boice, Jr. | |
| 4,958,874 A * | 9/1990 | Hegedus | B60P 3/0252 296/175 |
| 5,310,209 A * | 5/1994 | Holman | B60P 3/0255 280/43.1 |
| 5,375,899 A | 12/1994 | Wright | |
| 5,383,703 A * | 1/1995 | Irvine, III | B60P 3/36 296/24.45 |
| 5,706,616 A | 1/1998 | Fernandez | |
| D400,124 S | 10/1998 | Mason | |
| 5,833,293 A * | 11/1998 | Ludwig | B60P 3/00 296/21 |
| 5,833,294 A | 11/1998 | Williams et al. | |
| 5,918,924 A * | 7/1999 | Cowan | B60R 13/00 296/21 |
| D413,838 S | 9/1999 | McDaniel | |
| D426,493 S | 6/2000 | Mertins et al. | |
| 6,585,305 B2 | 7/2003 | Nazginov et al. | |
| D491,844 S | 6/2004 | Poulin | |
| D533,115 S | 12/2006 | Delamour | |
| D551,128 S | 9/2007 | Renard | |
| 7,287,349 B1 | 10/2007 | MacDonald et al. | |
| 7,621,576 B2 | 11/2009 | Cote | |
| 7,942,461 B2 | 5/2011 | Cohen et al. | |
| D652,353 S | 1/2012 | Cohen et al. | |
| D653,993 S | 2/2012 | Cohen et al. | |
| D656,866 S | 4/2012 | Wise | |
| 8,220,854 B2 | 7/2012 | Cohen et al. | |
| D678,823 S | 3/2013 | Cohen et al. | |
| 8,506,301 B2 | 8/2013 | Jaszlics | |
| 8,636,208 B2 * | 1/2014 | Urban | B60P 3/0257 235/379 |
| D701,471 S | 3/2014 | Cohen | |
| 8,690,215 B2 | 4/2014 | Cohen et al. | |
| D736,675 S | 8/2015 | Cohen | |
| 9,458,621 B2 | 10/2016 | Calafatis | |
| 9,481,283 B2 | 11/2016 | Cohen et al. | |
| D782,938 S | 4/2017 | Cohen et al. | |
| 9,700,761 B2 | 7/2017 | Beaver | |
| 9,750,999 B2 | 9/2017 | Monaco | |
| 2002/0153747 A1 * | 10/2002 | Ropp | B60P 3/14 296/24.45 |
| 2003/0038494 A1 * | 2/2003 | Nazginov | B60P 3/0255 296/21 |
| 2004/0256872 A1 * | 12/2004 | Piper | B60P 3/0257 296/24.36 |
| 2006/0248763 A1 * | 11/2006 | Tarabella | G09F 21/04 40/590 |
| 2008/0030427 A1 * | 2/2008 | Lanham | G09F 9/30 345/2.3 |
| 2009/0019747 A1 * | 1/2009 | Rosa | G09F 17/00 40/590 |
| 2009/0066106 A1 | 3/2009 | Liu | |
| 2009/0195008 A1 * | 8/2009 | Braswell | B60P 3/0252 296/26.15 |
| 2010/0036707 A1 * | 2/2010 | Gilchrist | G06Q 10/087 280/656 |
| 2010/0043264 A1 * | 2/2010 | Johnson, Jr. | G06Q 30/02 40/559 |
| 2010/0269419 A1 * | 10/2010 | Gyory | E04B 1/3444 52/79.5 |
| 2011/0313811 A1 | 12/2011 | Urban | |
| 2012/0255240 A1 | 10/2012 | Shen | |
| 2015/0315776 A1 * | 11/2015 | Duncan | A01G 9/14 52/66 |
| 2017/0158108 A1 | 6/2017 | Elbaz | |
| 2017/0232880 A1 | 8/2017 | Peterson | |

FOREIGN PATENT DOCUMENTS

| | | | | |
|---|---|---|---|---|
| DE | 202016102009 U1 * | 6/2016 | | B60P 3/14 |
| EP | 0070563 A1 * | 1/1983 | | G09F 21/04 |
| EP | 1635312 A1 * | 3/2006 | | G09F 15/0018 |
| FR | 766934 A * | 7/1934 | | G09F 21/04 |
| FR | 917441 A * | 1/1947 | | B60P 3/0257 |
| FR | 2904138 A1 * | 1/2008 | | G09F 15/0018 |
| GB | 652823 A * | 5/1951 | | B60P 3/0257 |
| GB | 2097341 A * | 11/1982 | | B60P 3/0252 |
| KR | 2004/39780 Y1 | 4/2008 | | |
| KR | 10-2016-0115172 | * 10/2016 | | |
| KR | 1020160115172 | 10/2016 | | |
| WO | WO-2011105094 A1 * | 9/2011 | | B60P 3/0257 |
| WO | WO-2011160167 A1 * | 12/2011 | | B60P 3/025 |

OTHER PUBLICATIONS https://www.aardvarkmobiletours.com/look-book/#! Retrieved Nov. 28, 2017 (Year: 2017).

https://www.streamcompanies.com/portfolio-piece/aardvark-event-logistics/ Available Jan. 2017 (Year: 2017).

* cited by examiner

US 10,160,370 B2

MOBILE SHOWROOM AND ADVERTISING SYSTEM

RELATED APPLICATIONS

The present case is related to Design Application No. 29/589,779 called Mobile Showroom and Advertising System, filed Jan. 4, 2017, the entire contents of which are incorporated herein by reference.

BACKGROUND OF THE INVENTION

Field of the Invention

The present invention relates to mobile showrooms and advertising systems. More particularly, the present invention relates to a mobile showroom and advertising vehicle.

Background of the Related Art

Over the years, various designs have been made for vehicles to be used for showrooms and advertising of products and/or services. For instance, U.S. Pat. No. 7,287,349 shows an advertising vehicle, U.S. Pat. No. 6,585,305 shows a showroom advertising vehicle, and U.S. Pat. No. 4,019,773 shows a showcase and advertising vehicle.

SUMMARY OF THE INVENTION

It is an object of the invention to provide a system for showcasing products and/or services. It is a further object of the invention to provide a system for advertising products and/or services.

A mobile truck body has a first panel extending forward from the front of a right side truck body panel and a second panel extending rearward from the rear of the right side truck body panel. The first and second panels extend the display area of the right side truck body panel. An upper panel and a lower panel are also provided at the right side truck body panel to provide access to an interior space of the truck body for showcasing products or services.

These and other objects of the invention, as well as many of the intended advantages thereof, will become more readily apparent when reference is made to the following description, taken in conjunction with the accompanying drawings.

DETAILED DESCRIPTION OF THE PREFERRED EMBODIMENTS

Figure 1:
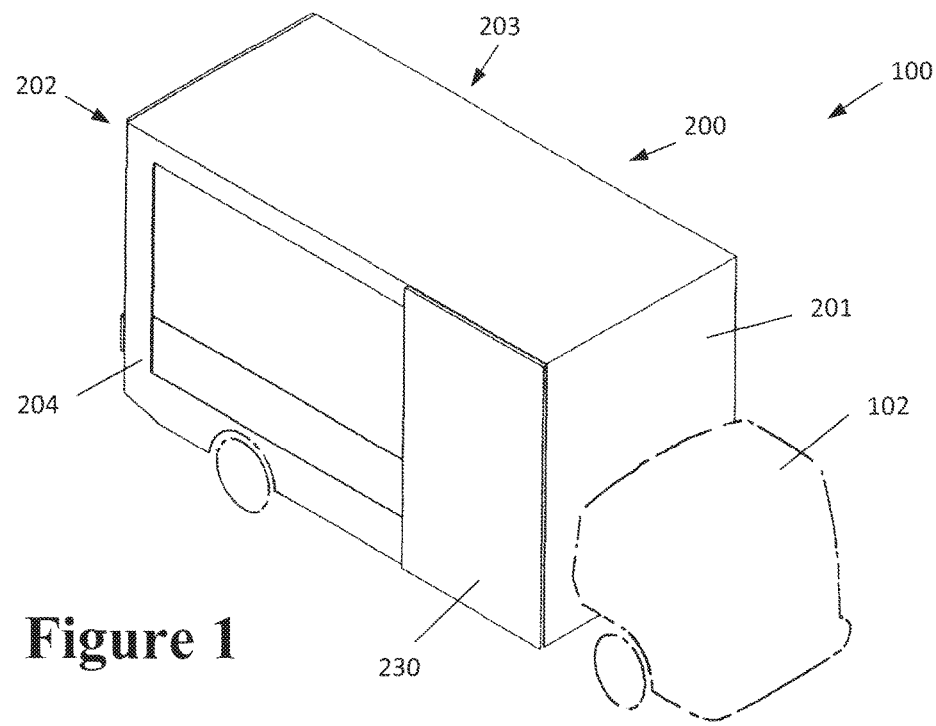
FIG. 1 is a perspective view of the mobile showroom and advertising system in accordance with an embodiment of the invention in the closed position for mobile transport.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents that operate in similar manner to accomplish a similar purpose. Several preferred embodiments of the invention are described for illustrative purposes, it being understood that the invention may be embodied in other forms not specifically shown in the drawings.

Turning to the drawings, FIGS. 1-11 show a mobile advertising and/or showroom system 100 in accordance with an illustrative, non-limiting embodiment of the invention. Here, the system 100 is a vehicle 100 having a cab or chassis 102 and a truck body 200. The chassis 102 houses the motor and vehicle driver and passengers and is at the front of the vehicle 100. The truck body 200 is mobile and can be transported by the chassis 102. Thus, the truck body 200 includes wheels and other conventional transportation elements. The truck body 200 houses the showroom and advertising of the system 100.

The truck body 200 has an elongated rectangular or cuboid shape with a front or front side 201, rear or rear side 202, left side or driver side 203, a right side or passenger side 204, a top or top side 205, and a bottom or bottom side 206 that forms the floor. Each side 201-206 can be a thin flat wall or panel, though the bottom 206 can be sturdier to support the weight of product and people inside the truck body 200. In addition, the sides 201-206 can be joined together in any suitable manner to form an interior space 208 and define an exterior. The left side, right side, top and bottom 203, 204, 205, 206 can have an elongated rectangular shape. The front, rear, left and right sides 201-204 are positioned substantially vertical, and the front and rear 201, 202 are substantially perpendicular to the left and right 203, 204. The top and bottom 205, 206 are positioned substantially horizontal and are substantially perpendicular to the front, rear, left and right sides 201, 202, 203, 204.

As further illustrated, the truck body 200 includes an advertising and showroom assembly 220 that is positioned about the right side 204. The assembly 220 includes a number of movable panels, including a front advertising panel 230, rear advertising panel 240, upper side showroom panel 250, and lower side showroom panel 260.

Front Advertising Panel 230

Figure 2:
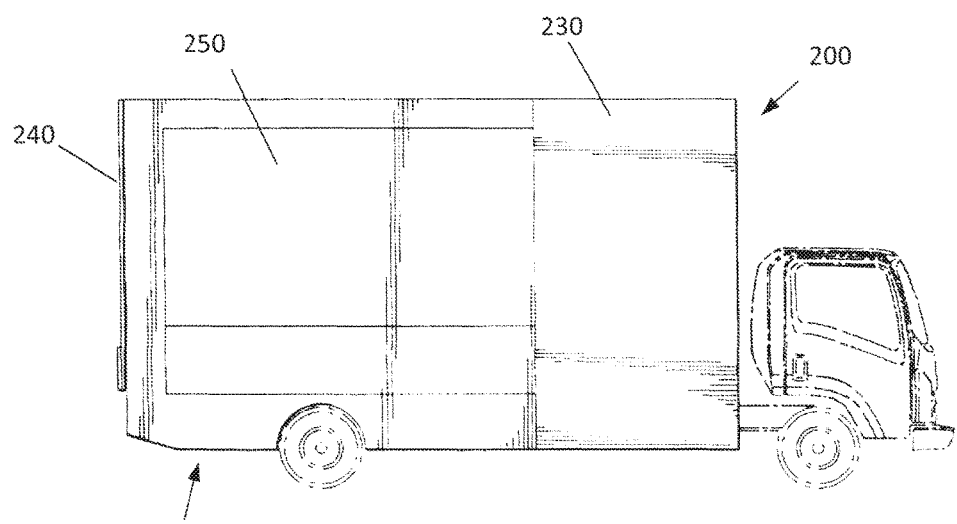
FIG. 2 is a right side view of the system of FIG. 1.

The front advertising billboard or panel 230 is located at the front of the truck body 200 and is positioned vertically. The front advertising panel 230 is a thin rectangular flat panel having a top horizontal edge 232, right or leading vertical edge 234, left or rear vertical edge 236 and bottom horizontal edge 238. As shown, the rear edge 236 is rotatably connected to the front leading vertical edge of the right side 204 (or the vertical corner between the right side 204 and the front side 201) by a connector or fastener, such as one or more hinges or the like that are arranged vertically to connect the left edge 236 of the panel 230 to the right edge of the right side panel 204. In one embodiment, an elongated hinge extends vertically along the entire height of the front advertising panel 230 and connects the entire left edge 236 of the front advertising panel 230 to the right edge of the right panel 204. Accordingly, the front advertising panel 230 can rotate about the connector between an opened position (FIGS. 3-6) and a closed position (FIGS. 1-2).

The front advertising panel 230 is placed in the opened position (FIGS. 3-6) when the truck body 200 is parked and a product or service is to be advertised. The interior space 208 can also optionally be opened at the same time to create a showroom. In the opened position, the front advertising panel 230 is fully open when the front advertising panel 230 is substantially linear with the right side panel 204, thus substantially forming a 180° angle between the front advertising panel 230 and the right side panel. That is, the right side panel 204 is in a first plane and the front advertising panel 230 is in a second plane that is co-planar with the first plane. Of course, the front advertising panel 230 need not be at a 180° angle with the right side panel 204, but can be at any suitable angle that is larger or smaller, though preferably greater than 90°.

Thus in the opened position, the front advertising panel 230 extends outward and forward from the front edge of the right side panel 204 to effectively extend the surface of the right side panel 204. A message can be printed on the surface of the front advertising panel 230 and/or on the surface of the right side panel 204 or a portion of the surface of the right side panel 204 (such as the portion shown to the right of the showroom panels 250, 260). The message can be on the front surface for display when in the opened position and/or on the back surface for display when in the opened and closed positions. For example, the message can be an advertisement or promotional message and can optionally be related to the goods or services contained in the interior space 208 of the showroom.

In one embodiment, the front advertising panel 230 can be substantially continuous with the right side panel 204. In addition, the front advertising panel 230 can be locked in the opened position by any suitable locking mechanism. For example, a rod can be attached at the bottom right of the front advertising panel 230 that can be rotated or extended downward to contact the ground. The rod can be pushed into the ground or can have a foot that can be fastened to the ground or pushes against the ground. In an alternative embodiment, a first locking member can be attached to the front advertising panel 230 and a second locking member can be provided on the chassis 102, and the first and second locking members can be releasably locked together when the front advertising panel 230 is in the opened position. Or, a telescoping or sliding bar (such as a pneumatic bar) can connect the front advertising panel 230 to the right side panel 204 (or to the front side panel 201) that can be locked at one or more positions between the closed position and the fully opened position. In one embodiment, the front advertising panel 230 has a same height as the right side panel 204 (as well as the left side panel 203, front panel 201 and rear panel 202), so that a more uniform message can be displayed on the panels 230, 204. And, the front advertising panel 230 has a width that is substantially the same as the length of the chassis 102 so that the front advertising panel 230 blocks the chassis 102 from view. Of course, the front advertising panel 230 can have a greater or smaller height and width, and can have a different shape or configuration than shown.

In the closed position (FIGS. 1-2), the front advertising panel 230 is folded over the right side panel 204 so that it is aligned with and touching the right side panel 204. In this position, the chassis 102 is fully visible and the front advertising panel 230 does not obstruct the view of the chassis 102 during driving. The front advertising panel 230 can fold over the top of the upper and lower showroom panels 250, 260 when closed, or can fold to the side of the showroom panels 250, 260 when either opened or closed. The front advertising panel 230 preferably lies flat against the right side panel 204 so that it does not obstruct the vehicle when the truck body 200 is being driven. The front advertising panel 230 can be locked in the closed position in any suitable manner. For example, the first locking member can be provided on the panel 230 (as used for locking in the open position), and a third locking member can be provided on the right side panel 204 or on one of the showroom panels 240, 250. The first and third locking members can be releasably locked together when the front advertising panel 230 is closed.

The front advertising panel 230 does not structurally support anything, so it can be relatively thin and lightweight. It can be made of plastic, wood, or other suitable material. It is further noted that the front advertising panel 230 can be formed as two or more separate members that are hinged together. For instance, the panel 230 can be cut vertically along a longitudinal axis to form two separate panels that are connected together by a connector or fastener such as a hinge. The panel 230 can then be folded over itself for storage, whereby the rear panel portion folds over the right side panel 204 and the leading panel portion folds back over the rear panel. Or, the panel 230 can be cut horizontally along a transverse axis with the upper panel portion hinged to the edge between the right side panel 204 and the front panel 201 so that it folds or rotates forward against the front panel 201; and the lower panel portion hinged horizontally to the top panel portion so that it folds or rotates up over the top panel portion so that the upper and lower panel portions lie flat against the front side panel 201 above the chassis 102.

Rear Advertising Panel 240

The rear advertising billboard or panel 240 is located at the rear of the truck body 200 and is positioned vertically. The rear advertising panel 240 is a thin rectangular flat panel having a top horizontal edge 242, right or leading vertical edge 244, left or rear vertical edge 246 and bottom horizontal edge 248. As shown, the leading edge 246 is rotatably connected to the rear edge of the right side 204 (or the vertical corner between the right side 204 and the rear side 202) by a vertical connector or fastener, such as one or more hinges or the like that are arranged vertically to connect the right edge of the panel 240 (or just the upper panel portion 241) to the left edge of the right side panel 204. In one embodiment, an elongated hinge extends vertically along the entire height of the upper panel portion 241 and connects the entire right edge of the upper panel portion 241 to the left edge of the right panel 204. Accordingly, the rear advertising panel 240 can rotate about the connector between an opened position (FIGS. 3-6) and a closed position (FIGS. 1-2).

The rear advertising panel 240 is placed in the opened position (FIGS. 3-6) when the truck body 200 is parked and a product or service is to be advertised. The interior space 208 can also optionally be opened at the same time to create a showroom, and the front advertising panel 230 can also be in the opened position. In the opened position, the rear advertising panel 240 is fully open when the rear advertising panel 240 is substantially linear with the right side panel 204, thus substantially forming a 180° angle between the rear advertising panel 240 and the right side panel 204. That is, the right side panel 204 is in a first plane and the rear advertising panel 230 is in a third plane that is co-planar with the first plane (and optionally also the second plane of the front advertising panel 204). Of course, the rear advertising panel 240 need not be at a 180° angle with respect to the right side panel 204, but can be at any suitable angle that is larger or smaller, though preferably greater than 90°.

Thus in the opened position, the rear advertising panel 240 extends outward and rearward from the rear edge of the right side panel 204 to effectively extend the surface of the right side panel 204. A message can be printed on the surface of the rear advertising panel 240 and/or on the surface of the right side panel 204 or a portion of the surface of the right side panel 204 (such as the portion shown to the right of the showroom panels 250, 260). The message can be on the front surface for display when in the opened and closed positions and/or on the back surface for display when in the opened position. For example, the message can be an advertisement or promotional message and can optionally be related to the goods or services contained in the interior space 208 of the showroom.

In one embodiment, the rear advertising panel 240 can be substantially continuous with the right side panel 204. In addition, the rear advertising panel 240 can be locked in the opened position by any suitable locking mechanism. For example, a rod can be attached at the bottom right of the rear advertising panel 240 that can be rotated or extended downward to contact the ground. The rod can be pushed into the ground or can have a foot that can be fastened to the ground or pushes against the ground to keep the panel 240 in a desired opened position. In an alternative embodiment, a telescoping or sliding bar (such as a pneumatic bar) can connect the rear advertising panel 240 to the right side panel 204 (or to the rear side panel 202) that can be locked at one or more positions between the closed position and the fully opened position. In one embodiment, the rear advertising panel 240 has a same height as the right side panel 204 (as well as the left side panel 203, front panel 201 and rear panel 202), so that a more uniform message can be displayed on the panels 240, 204. And, the rear advertising panel 240 has a width that is substantially the same as the rear panel 202 so that the rear advertising panel 240 is substantially the same size as the rear panel 202. Of course, the rear advertising panel 240 can have a greater or smaller height and width, and can have a different shape or configuration than shown.

In the closed position (FIGS. 1-2), the rear advertising panel 240 is folded over the rear panel 202 so that it is aligned with and touching the rear panel 202. As shown, the rear advertising panel 240 can have an upper panel portion 241, a lower flap or panel portion 243, and a connector or fastener 245. The connector 245 rotatably connects the upper portion 241 to the lower portion 243 and can be, for example, one or more hinges arranged horizontally along the horizontal bottom edge of the upper portion 241 and the horizontal upper edge of the lower portion 243. The connector 245 forms a horizontal axis across the entire width of the upper and lower panel portions 241, 243. In the opened position, the lower panel portion 243 is folded downward in a vertical position to extend downward from the upper panel portion 241 to make the rear advertising panel 240 larger. In the closed position, the lower panel portion 243 is rotated or folded upward about the horizontal axis and the connector 245 onto the bottom section of the upper panel portion 241 so that the lower panel portion 243 does not obstruct the lights at the rear and bottom of the truck body 200. And, the rear advertising panel 240 does not obstruct driving.

The rear advertising panel 240 can be locked in the closed position in any suitable manner. For example, a first locking member can be provided on the panel 240, and a second locking member can be provided on the rear panel 202. The first and second locking members can be releasably locked together when the front advertising panel 230 is closed. In one embodiment, a releasable locking pin member (or threaded bolt/screw) can be provided in the lower panel portion 243 that extends through the upper panel portion 241 and into the rear panel 202 or into a bracket attached at the rear panel 202 or into a pin lock receiving member or opening (a threaded opening if using a bolt) at the rear panel 202.

In an alternative embodiment, the rear advertising panel 240 can fold forward over the top of the right side panel 204 and over the top of the upper and lower showroom panels 250, 260 when closed, or can fold to the side of the showroom panels 250, 260 when either opened or closed. In this embodiment, the rear advertising panel 240 preferably lies flat against the right side panel 204 so that it does not obstruct the vehicle when the truck body 200 is being driven. And the rear advertising panel 240 can be locked to the right side panel 204 or the showroom panels 250, 260. For instance, a first locking member can be provided on the panel 240 and a second locking member can be provided on the right side panel 204 or one of the showroom panels 250, 260.

In one embodiment, one or more elongated L-shaped support brackets are rotatably connected (such as by a hinge) to the left (driver side) vertical edge of the rear panel 202 aligned with the upper panel portion 241. The bracket can extend the entire height of the upper panel portion 241 or a portion thereof. The upper panel portion 241 is folded closed against the rear panel 202, then the L-shaped bracket is rotated about the hinge to fold over the top surface of the upper panel portion 241 to lock the upper panel portion 241 to the rear panel 202. The lower panel portion 243 can then be folded up onto the upper panel portion 241 and a locking pin can be pushed or screwed into an opening in the lower panel portion 243 and L-shaped bracket and/or upper panel portion 241.

The rear advertising panel 240 does not structurally support anything, so it can be relatively thin and lightweight. It can be made of plastic, wood, or other suitable material. It is further noted that the rear advertising panel 240 can be formed as two or more separate members that are hinged together. For instance, the panel 240 can be cut vertically along a longitudinal axis to form two separate panels that are connected together by a connector or fastener such as a hinge. The panel 240 can then be folded over itself for storage, whereby the leading panel portion folds over the rear or right panels 202, 204 and the rear panel portion folds back over the leading panel portion. Each of the leading and rear panel portions can be substantially the same size as the rear panel 202, since they fold over each other to align with the rear side panel 202.

Upper Showroom Panel 250

Figure 3:
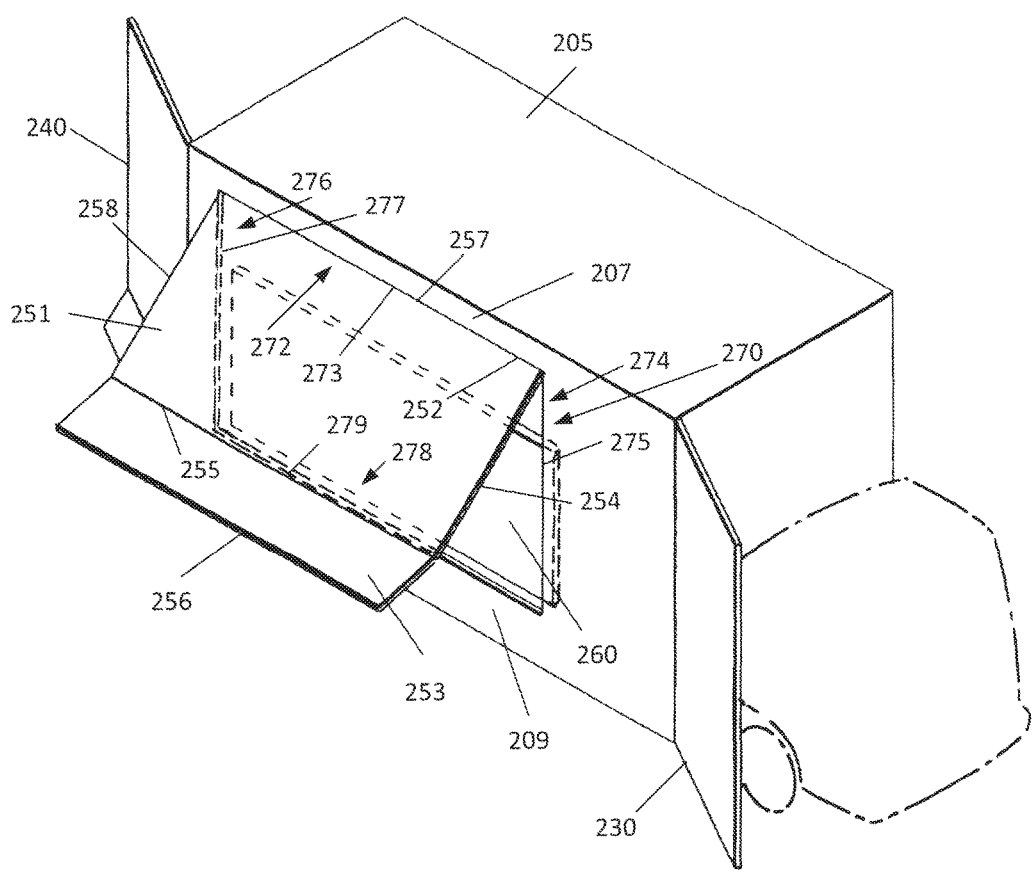
FIG. 3 is a perspective view of the system in an intermediary configuration between the closed position and the opened position.
Figure 4:
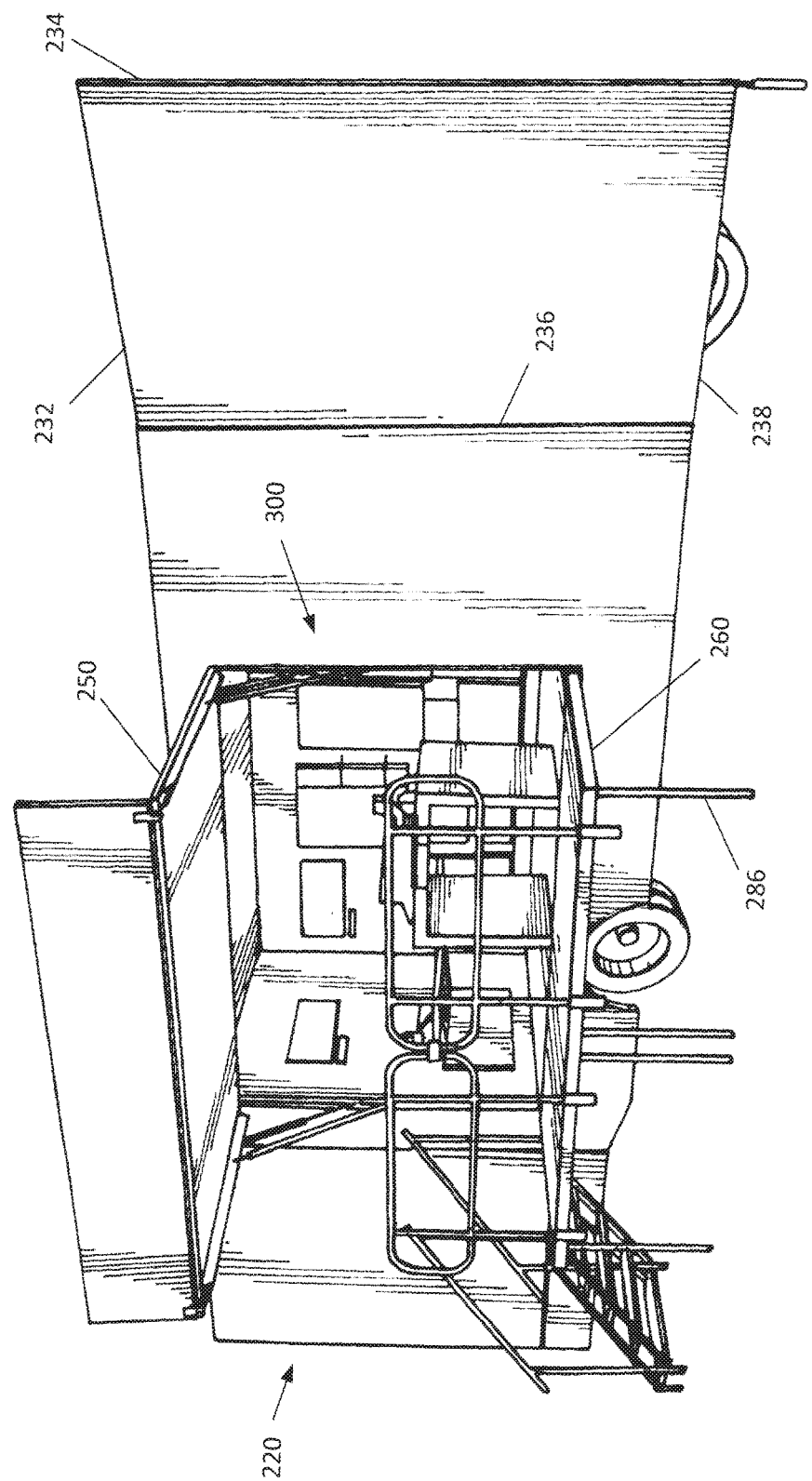
FIG. 4 is a perspective view of the system in a fully opened position.
Figure 5:
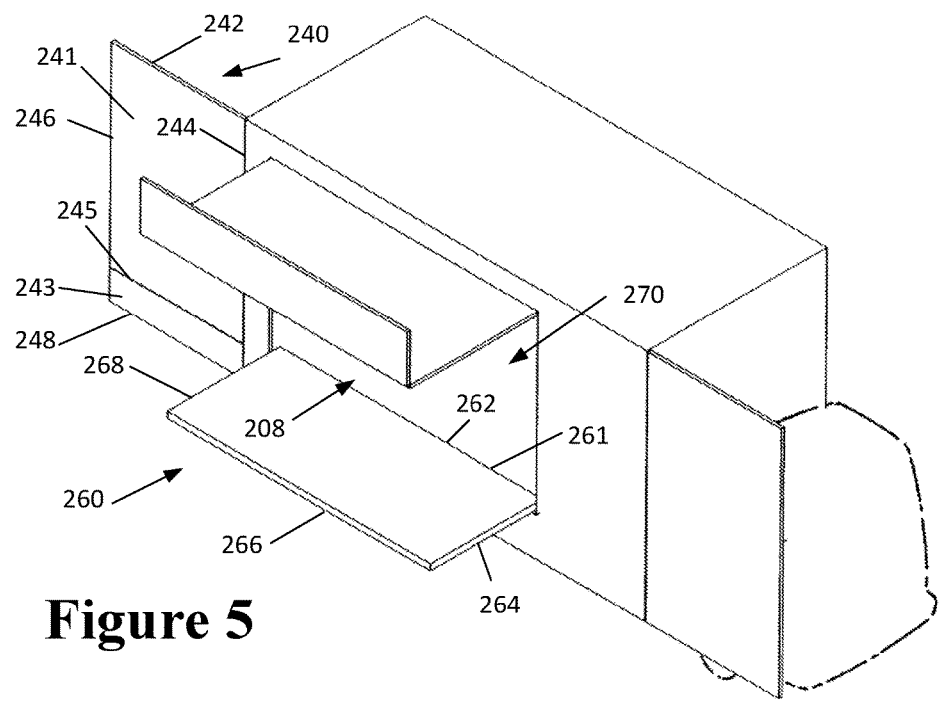
FIG. 5 is a perspective view of the system in a fully opened position.
Figure 6:
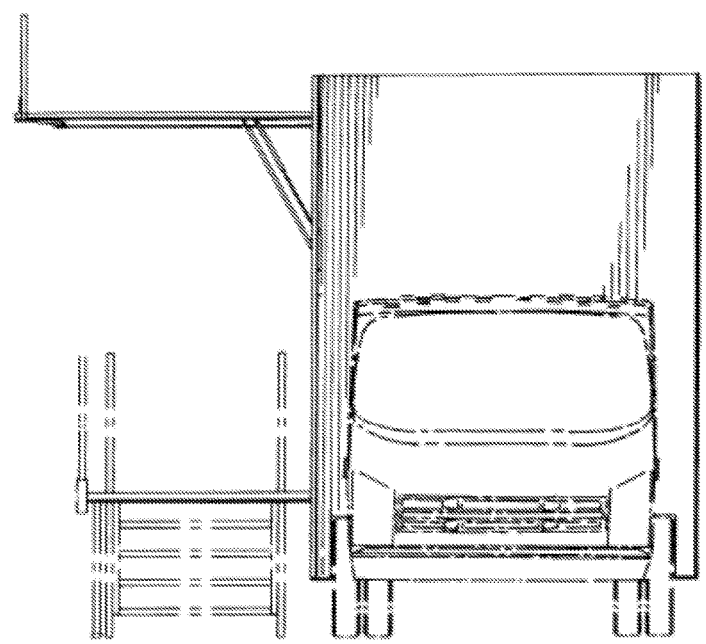
FIG. 6 is a front view of the system in a fully opened position.

As further shown in FIGS. 3-5, an opening 270 is formed in the right side panel 204. In the illustrative, non-limiting embodiment shown, the opening 270 can have a thin flat rectangular shape with an upper edge 272, right or leading edge 274, left or rear edge 276 and bottom edge 278. The upper edge 272 is spaced apart (downward) from the top edge of the right panel 204 so that the right panel 204 has a header portion 207 above the opening 270. The lower edge 278 is spaced apart (upward) from the lower edge of the right panel 204 so that the right panel 204 has a footer portion 209 below the opening 270. A metal frame is fitted at the edges 272, 274, 276, 278 of the opening 270, including a top frame member 273, right side frame member 275, left side frame member 277, and bottom frame member 279. The frame members reinforce and support the opening 270 and the right side panel 204.

The upper showroom panel 250 is also rectangular in shape and can be substantially the same size as the opening 270. A connector 257 rotatably connects the showroom panel 250 to the header portion 207 and can be, for example, one or more hinges arranged horizontally along the horizontal upper edge of the showroom panel 250 and the horizontal bottom edge of the header portion 207. The connector 257 forms a horizontal axis across the entire width of the opening 270. In one embodiment, a single elongated hinge 257 extends substantially the entire width of the opening 270 and connects the entire upper edge of the upper showroom panel 250 to the header portion 207.

In addition, the upper showroom panel 250 has an upper panel portion 251, a flap or lower panel portion 253, and a connector or fastener 255. The connector 255 rotatably connects the upper portion 251 to the lower portion 253 and can be, for example, one or more hinges arranged horizontally along the horizontal bottom edge of the upper portion 251 and the horizontal upper edge of the lower portion 253. The connector 255 forms a horizontal axis across the entire width of the upper and lower panel portions 251, 253. In one embodiment, a single elongated hinge 255 extends substantially the entire width of the opening 270 and connects the entire lower edge of the upper showroom panel 250 to the entire upper edge of the lower portion 253.

In the opened position, the upper panel portion 251 is rotated upward about the connector 257 to a horizontal position at the top of the opening 270, and the lower panel portion 253 is folded upward about the connector 255 to a vertical position that is substantially perpendicular to the upper panel portion 251. A message (advertising or promotional or the like) can be displayed on the surface of the lower panel portion 253. The upper panel portion 251 provides protection to users, such as from the sun or rain.

In the closed position, the lower panel portion 253 is straight or coplanar with the upper panel portion 251 so that the entire showroom panel 250 is coplanar. The showroom panel 250 can then be locked to the right panel 204 in any suitable manner. For example, a locking pin can extend through a bracket in the showroom panel 250 into the right frame member 275 and/or left frame member 277. When the upper showroom panel 250 is closed, it is flush with or recessed from the outer surface of the right panel 204, so that the lower showroom panel 260 and/or front advertising panel 230 and/or rear showroom panel 250 can be folded over top.

As further illustrated in FIGS. 4, 5, a first elongated bracket 290 can be provided on the inner surface of the upper panel portion 251. The bracket 290 is a thin elongated flat metal piece that extends near the right and left transverse edges 254, 258 of the upper panel portion 251. The bracket 290 can have a general L-shape cross-section so that the bracket 290 extends outward from the inner face of the upper portion 251, and the ends can be angled. A support arm 294, such as a pneumatic or hydraulic support arm, has a first end that connects to a proximal end of the bracket 290, and a second end opposite the first end that connects to the right and/or left frame members 275, 277. Multiple support arms 294 can be provided at each side 274, 276 of the opening 270, as needed. The support arms 294 support the upper showroom panel 250 when it is in the opened position, and particularly keeps the upper panel portion 251 in a horizontal position. The arms 294 also make it easier for the user to raise and lower the showroom panel 250.

Figure 9:
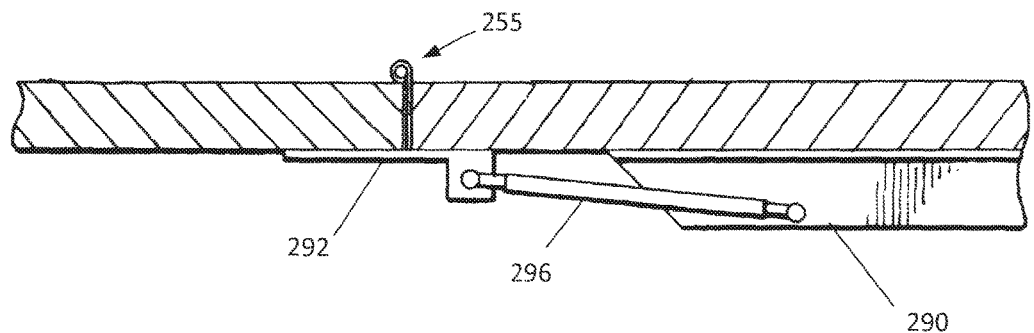
FIG. 9 is a cross-sectional side view of the upper and lower panel portions of the lower showcase panel in a closed position.
Figure 10:
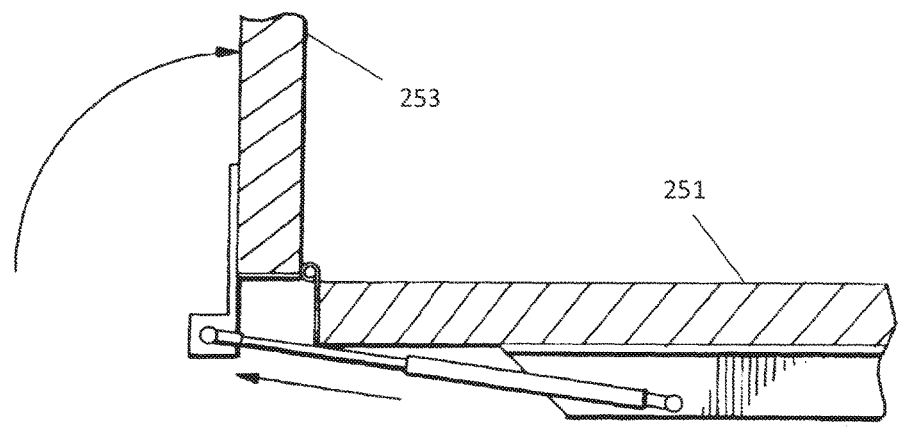
FIG. 10 is a cross-sectional side view of the upper and lower panel portions of the lower showcase panel in an opened position.

Turning to FIGS. 9-10, a second bracket 292 is also provided on the inner surface of the lower panel portion 253. The bracket 292 can be a thin elongated flat metal piece that has a first end which is affixed to the lower panel portion 253 and a second end opposite the first end which extends downward beyond the upper edge of the lower panel portion 253. A second support arm 296 has a first end that connects to the first bracket 290 of the upper panel portion 251 and a second end opposite the first end that connects to the second free end of the second bracket 292 of the lower panel portion 253. The second support arm 296 supports the lower panel portion 253 when it is in the opened position, and particularly keeps the lower panel portion 253 in a vertical position with respect to the upper panel portion 251. The arm 296 also makes it easier for the user to raise and lower the lower panel portion 253.

The upper and lower panel portions 251, 253 can be further configured to house lights, audio equipment and electricity. For instance, the panel portions 251, 253 can have a frame with a first panel along one side of the frame to form an inner side and a second panel along an opposite side of the frame to form an outer side that is substantially parallel to the first panel. Thus, the frame is sandwiched between the first and second panels to provide a space or gap between the first and second panels. Various equipment can be provided in the gap, such as lighting and audio speakers. And, electrical wires can extend from the interior space 208 of the truck body 200 into the interior space of the showroom panels 251, 253 to provide power to that equipment. Other design features can also be provided in the gap. The first and second panels can be relatively thin and lightweight, and for example can be made of plastic, wood, or other suitable material.

The lower panel portion 253 is shown as rectangular. However, other suitable shapes can be provided. For example the lower edge can be curved or rounded to provide a more aesthetic display. And, the lower panel portion 235 can have a fastener or connector that mates with a fastener or connector of a separate sign or display to removably attach the separate sign or display to the lower panel portion 235.

Lower Showroom Panel 260

The lower showroom panel 260 is also rectangular in shape and is thin and flat. The panel 260 can have substantially the same width (i.e., along sides 272, 278) as the opening 270, but has a height (i.e., along sides 274, 276) that is less than the height of the opening 270, though the height can be substantially the same as the opening 270. The lower panel 260 has a lower edge 262, right or leading edge 264, upper edge 266, and a left or rear edge 268. A connector 261 rotatably connects the showroom panel 260 to the floor at the interior space 208 of the truck body 200. Or the connector 261 can connect the showroom panel 260 to the lower side 278 of the opening 270 and can be, for example, one or more hinges arranged horizontally along the horizontal lower edge of the showroom panel 260 and the horizontal upper edge of the footer portion 209 of the right panel 204 at lower edge 278 of the opening 270, to connect the lower showroom panel 260 to the floor at the interior space 208 of the truck body 200. The connector 261 forms a horizontal axis across the entire width of the opening 270. In one embodiment, a single elongated hinge 261 extends substantially the entire width of the opening 270 and connects the entire lower edge 262 of the lower showroom panel 260 to the footer portion 209 and the floor at the interior space 208 of the truck body 200.

Figure 11:
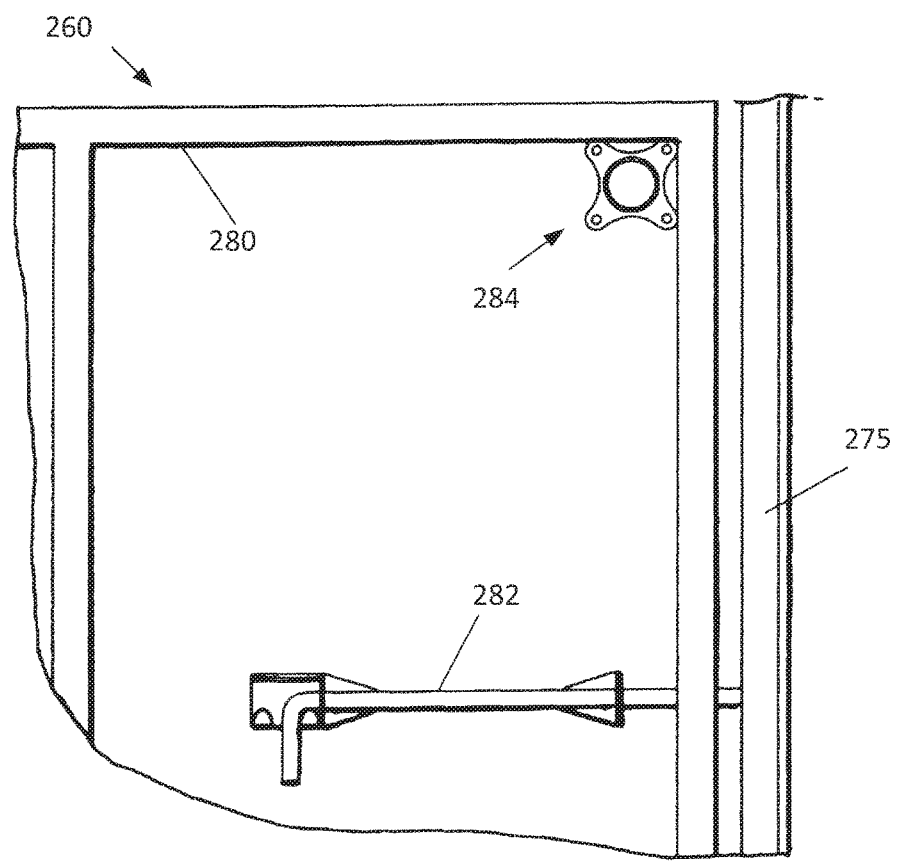
FIG. 11 is a bottom view of the lower showcase panel.

In a closed position, the lower panel 260 (and the connector 261) is recessed with respect to the right side panel 204. The lower showroom panel 260 can then be locked to the right panel 204 in any suitable manner. For example as shown in FIG. 11, the lower panel 260 can be folded upward to the closed position, and a locking pin 282 can be positioned on the bottom surface of the panel 260 and extend through a bracket or frame member 280 in the showroom panel 260 into the right frame member 275 and/or left frame member 277 of the right panel 204.

In addition, the upper showroom panel 250 closes over the top of the lower showroom panel 260, and further prevents the lower showroom panel 260 from moving forward and downward. Since the lower showroom panel 260 is recessed, the upper showroom panel 250 can be folded over top of the lower showroom panel 260 and still be flush with or recessed from the outer surface of the right panel 204 when it is closed, and/or front advertising panel 230 and/or rear showroom panel 250 can be folded over top. In one embodiment, the lower panel 260 folds upward and is locked to the frame opening by a locking pin(s) 282, then the upper panel 250 folds over the lower panel 260 and is locked to the frame opening by a locking pin(s), and then the front panel 230 is folded over the upper panel 250 and further locked to the right panel 204 by a locking pin or other suitable locking mechanism.

Figure 7:
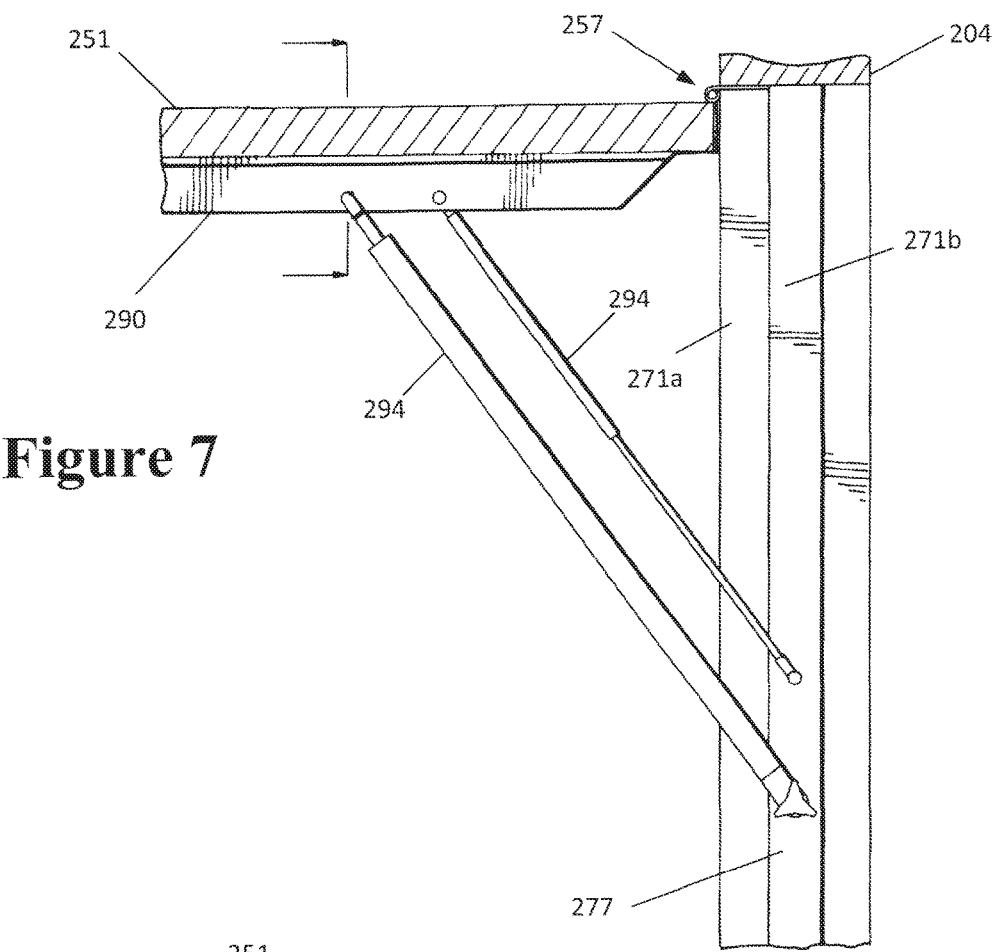
FIG. 7 is a cross-sectional side view of the upper showcase panel having brackets and pneumatic support arms.
Figure 8:
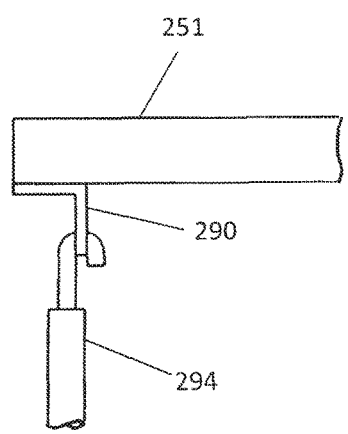
FIG. 8 is an enlarged cross-sectional view taken along the lines of FIG. 7.

In one embodiment shown in FIG. 7, each of the frame members 272-278 include a first frame member 271a and a second frame member 271b. The first frame member 271a extends inward from the top surface of the panel 204 and against the opening edges 272, 274, 276, 278 to form a wider opening that receives the upper showcase panel 250. The second frame member 271b is recessed with respect to the top surface of the panel 204 and extends inward from the opening edges 272, 274, 276, 278 to form a narrower opening that receives the lower showcase panel 260. A lip is formed between the wider first frame member 271a and the narrower second frame member 271b. A seal is affixed to the lip about the entire periphery of the opening 270, such as an elongated plastic or rubber.

In the closed position, the lower showcase panel 260 is smaller than the opening created by the second frame member 271b so that it fits inside the second frame member 271b and locks to the second frame member 271b. The upper showcase member 250 is smaller than the opening created by the first frame member 271a but larger than the opening created by the second frame member 271b. In addition, the support arms 294 are connected to the second frame member 271b, so that the upper showcase member 250 in the closed position comes to rest against the seal of the lip, inside the first frame member 271a, which prevents water from entering the interior space 208 when in the closed position. Accordingly, the lower showcase member 260 is at a recessed position and the upper showcase member 260 outside the lower showcase member 260 and can be flush with the outer surface of the panel 204.

In an opened position, the lower panel 260 is rotated downward about the connector 261 to a horizontal position at the bottom of the opening 270. Referring to FIG. 11, a metal frame 280 is provided at the bottom of the panel 260. The panel 260 and frame 280 supports the weight of people walking on the top surface of the panel 260. The frame 280 includes at least two longitudinal members and at least two transverse members extending about the outer periphery of the panel 260. Additional longitudinal members and transverse members can be provided between the longitudinal members in a ladder pattern to provide further support.

As further shown in FIG. 11, a post support bracket 284 is provided at each of the corners on the bottom of the lower showcase panel 260 along the distal longitudinal edge 266. Turning to FIG. 4, a support post 286 is removably received in the post support bracket 284. The posts 286 are inserted in the brackets 284 prior to or as the lower showcase panel 260 is lowered to the opened position. The posts 286 come to rest on the ground to support the lower showcase panel 260 in the opened position. The posts 286 and brackets 284 can be placed at the distal edge 266 of the lower panel 260, or can be placed at other suitable locations as needed. In an alternative embodiment, the posts 286 and brackets 284 can be foldably connected so that the posts 286 fold up to be retained and stored along the frame 280 at the underside of the panel 260 and can fold down when ready for use. The length of the posts 286 can also be adjusted to conform to the surface at which the truck body 200 is being used.

Turning to FIG. 4, the lower panel 260 in the opened position operates as a platform for customers to enter and exit the interior space 208 of the truck body 200. A staircase and railings can be removably coupled to the lower showcase panel 260. For example, post support brackets can be provided on the top surface of the lower showcase panel 260 or about the outer periphery of the panel 260 (as shown) to removably and slidably receive posts of the railings. The stairs can also have posts that are slidably and removably received in post brackets positioned at the front and/or rear side 264, 268 of the panel 260.

The Showroom and Advertising Assembly 220

As best shown in FIG. 4, the showroom and advertising assembly 220 is formed by a showroom 300 and the front and rear advertising panels 230, 240. The showroom 300 includes the upper and lower showroom panels 250, 260, as well as the interior space 208 of the truck body 200. The interior space 208 can be fitted with shelves and other display units that house the products or services. Display units can also be placed on or about the lower showroom panel 260 when it is in the opened position. The interior space 208 is the area between and closed in by the front, rear, left, and right sides 201, 202, 203, 204, as well as the top and bottom 205, 206. The interior space 208 is fully enclosed on three sides (panels 201, 202, 203) and is only opened at the opening 270 in the fourth side (panel 204), which provides easy ingress and egress into and from the interior space 208 by customers.

The showroom and advertising assembly 220 (including the opening 270 and the upper/lower showroom panels 250, 260) is shown on the passenger side of the truck body 200, so that the showroom 300 and advertising panels 230, 240 open up to and face the sidewalk when parked in a street location. However, the assembly 220 (including the opening 270 and the upper/lower showroom panels) can be on the driver side of the truck body 200 or on both longitudinal sides of the truck body 200, or at the rear 202 of the truck body 200. In yet another alternative embodiment, one or more slideouts can be positioned in one or more of the front, rear, left and right sides 201-204 to provide additional showroom space at the interior 208 of the truck body 200.

In combination, assembly 220 (and particularly the front advertising panel 230, rear advertising panel 240, upper showroom panel 250 and lower showroom panel 260) forms a continuous and seamless system for advertising and displaying products and services. The front and rear advertising panels 230, 240, together with the right panel 204, form a continuous display that draws attention to and centers about the showroom 300. And the upper and lower showroom panels 250, 260 form a wide opening that allows for enjoyable viewing and display of the products and services. However, it should further be noted that the panels 230, 240, 250, 260 each have independent utility and can be used separately or in different combinations or with other suitable advertising or showroom features. Each of the panels 230-260 are easy to use, can be quickly and easily folded between an open position for use and a closed position for storage and transport.

The front and rear advertising panels 230, 240 are substantially rectangular with a longitudinal axis that extends substantially vertical. The front advertising panel 230 is opens forward and closes against the right side 204, whereas the rear advertising panel 230 opens forward and closes against the rear panel 202. The upper and lower showroom panels 250, 260 are substantially rectangular with a longitudinal axis that extends substantially horizontal. The upper showroom panel 250 opens upward to a horizontal position and the lower showroom panel 260 opens downward to a horizontal position.

Though the system 100 is shown and described as having a chassis 102, it will be appreciated that any suitable chassis can be utilized. The chassis 102 can be removably connected to the truck body 200. And the system 100 need not have a chassis 102 and can just have a truck body 200 that is towed by a separate vehicle or can be a free-standing (non-mobile) structure. Or, the invention can be implemented in another type of vehicle, and not a truck, such as a trailer. In yet another alternative embodiment, the upper showcase panel and/or lower showcase panel can be controlled by one or more electric motors that raise and lower the panels 250, 260 between the opened and closed positions. The front and rear advertising panels 230, 240 can also be controlled by the motors to move them between the opened and closed positions. In a further embodiment of the invention, a door can be provided on the left side 203 of the truck body 200 to provide another entrance into the interior space 208 of the truck body 200.

Operation and Summary

Operation of the truck body 200 will be described with respect to FIGS. 1, 3, 5. Starting with FIG. 1, the truck body 200 is in a storage or driving configuration, where the front and rear advertising panels 230, 240 are in a closed position and the upper and lower showcase panels 250, 260 are in a closed position. Turning to FIG. 3, the truck body 200 is then moved into an operating configuration where all the panels 230, 240, 250, 260 are moved to the opened positions, which is shown in FIG. 5. The front advertising panel 230 is unlocked and swung forward to the opened position, then locked in position. The upper showcase panel 250 is then raised to the opened position. Posts 286 are inserted into the lower showcase panel 260 and the lower showcase panel 260 is unlocked and then lowered to the opened position. In an alternative embodiment, the lower showcase panel 260 can be positioned to the outside of the upper showcase panel 250 in the closed positions, so that the lower showcase panel 260 can be lowered first. The rear advertising panel 240 can be moved to the opened position and locked at any time during setup. To close the truck body 200, the steps are reversed.

In one embodiment of the invention, the truck body 200 formed by the panels 201, 202, 203, 204 is up to approximately 96 inches in width and 18 feet in length and 125⅞ inches in height, and the interior space 208 is up to approximately 92⅝ inches in width and 100 inches in height. The front advertising panel 230 is up to approximately 72 inches in width and 125.5 inches in height, and the rear advertising panel 240 is up to approximately 72 inches in width and 120.5 inches in height (with the upper panel portion 241 being up to approximately 104⅜ inches in height and the lower panel portion 243 being up to approximately 15¹¹⁄₁₆ inches in height). The opening 270 is large enough so that a person can walk through it without obstruction, and in one embodiment is up to approximately 12 feet long and 8 feet high. The upper panel portion 251 is up to approximately 143⅛ inches in width and 69 inches in height, and the lower panel portion 253 is up to approximately 143⅛ inches in width and 25.5 inches in height. The lower showcase panel 260 is up to approximately 141.25 inches in width and 60⅛ inches in height, and is recessed approximately 4.25 inches so that it extends approximately 55⅞ inches from the outer surface of the right panel 204. The opening 270 need not be centered on the right panel 204, but can be offset vertically and/or horizontally. For example, the opening can be approximately 13⁹⁄₁₆ inches from the rear side 202, 58⁹⁄₁₆ inches from the front side 201, and have a header portion 207 of approximately 10¹⁵⁄₁₆ inches in height and a footer portion 209 of approximately 20¹¹⁄₁₆ inches in height. The panels 230, 240, 250, 260 can be up to approximately 0.25-0.75 inches thick or even an inch or more thick, and can be made of wood, plastic, compressed cardboard or laminate, or any other suitable material.

It is further noted that the invention is described for advertising and as a showroom. However, the invention can be utilized for any suitable purpose, such as transportation, sales, sampling activities (e.g., to sample coffee), and promotions. In addition, the invention includes the method or process or making and/or using the truck body 200.

It is noted that the description uses several geometric or relational terms, such as circular, rounded, parallel, curved, perpendicular, and flat. In addition, the description uses several directional or positioning terms and the like, such as top, bottom, left, right, up, down, interior, front, rear, outer, distal, and proximal. Those terms are merely for convenience to facilitate the description based on the embodiments shown in the figures. Those terms are not intended to limit the invention. Thus, it should be recognized that the invention can be described in other ways without those geometric, relational, directional or positioning terms. In addition, the geometric or relational terms may not be exact. For instance, walls may not be exactly perpendicular or parallel to one another but still be considered to be substantially perpendicular or parallel because of, for example, roughness of surfaces, tolerances allowed in manufacturing, etc. And, other suitable geometries and relationships can be provided without departing from the spirit and scope of the invention.

Within this specification, the terms "substantially," "about" and "approximately" mean plus or minus 20%, more preferably plus or minus 10%, even more preferably plus or minus 5%, most preferably plus or minus 2%. In addition, while specific dimensions, sizes and shapes may be provided in certain embodiments of the invention, those are simply to illustrate the scope of the invention and are not limiting. Thus, other dimensions, sizes and/or shapes can be utilized without departing from the spirit and scope of the invention.

The foregoing description and drawings should be considered as illustrative only of the principles of the invention. The invention may be configured in a variety of shapes and sizes and is not intended to be limited by the preferred embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

The invention claimed is:

1. A mobile system comprising:
an elongated truck or trailer body configured to be coupled with a truck or trailer cab, said truck or trailer body having a front with a vertical front panel behind the truck or trailer cab, a rear with a vertical rear panel, a first side with a vertical first side panel and a second side with a vertical second side panel, said second side panel having a surface for displaying a message;
a first panel connected at the front of the truck or trailer body at the second side panel, said first panel movable between a closed position wherein the first panel is folded over the second side panel and an opened position wherein the first panel extends outward from the second side panel and forward along said truck or trailer cab, said first panel having a surface for displaying a message;
a second panel connected at the rear of the truck or trailer body at the second side panel, said second panel movable between a closed position wherein the second panel is folded over the rear panel and an opened position wherein the second panel extends outward from the second side panel, said first panel having a surface for displaying a message; and
a ground locking mechanism coupled to said second panel, said ground locking mechanism configured to secure said second panel to the ground in the opened position.

2. The system of claim 1, wherein in the opened position the surface of said second side panel is coplanar with the surface of said first panel and the surface of said second panel.

3. The system of claim 1, further comprising:
an opening in said second side panel, said opening having a lower edge, upper edge, right edge and left edge; and
a lower support panel having a distal edge and a proximal edge connected at the lower edge of said opening, said lower support panel having a closed position wherein said lower support panel is substantially vertical and the distal edge is releasably locked to the second side panel, and an opened position wherein said lower support panel is substantially horizontal and extending substantially perpendicularly outward from said second side panel at the lower edge of said opening.

4. The system of claim 3, further comprising:
an upper support panel having a distal edge and a proximal edge connected at the upper edge of said opening, said upper support panel having a closed position wherein said lower support panel is substantially vertical and the distal edge is releasably locked to the second side panel, and an opened position wherein said upper support panel is substantially horizontal and extending substantially perpendicularly outward from said second side panel at the upper edge of said opening.

5. The system of claim 3, said truck or trailer body having an interior space and said opening provides access to said interior space.

6. The system of claim 3, further comprising one or more support posts coupled to said lower support panel to support said lower support panel in the opened position.

7. The system of claim 1, further comprising:
an opening in said second side panel, said opening having a lower edge, upper edge, right edge and left edge; and
a lower support panel having a distal edge and a proximal edge connected at the lower edge of said opening, said lower support panel having a closed position wherein said lower support panel is substantially vertical and the distal edge is releasably locked to the second side panel, and an opened position wherein said lower support panel is substantially horizontal and extending substantially perpendicularly outward from said second side panel at the lower edge of said opening.

8. The system of claim 7, further comprising:
an upper support panel having a distal edge and a proximal edge connected at the upper edge of said opening, said upper support panel having a closed position wherein said lower support panel is substantially vertical and the distal edge is releasably locked to the second side panel, and an opened position wherein said upper support panel is substantially horizontal and extending substantially perpendicularly outward from said second side panel at the upper edge of said opening.

9. The system of claim 1, wherein the surface of the second panel in the second panel opened position is coplanar with the surface of the second side panel.

10. The system of claim 1, wherein the ground locking mechanism comprises a rod.

11. The system of claim 1, wherein the surface of said first panel in the opened position is substantially continuous with the surface of said second side panel.

12. The system of claim 1, wherein the surface of said first panel, the surface of said second panel and the surface of said second side panel are coplanar.

13. A mobile system comprising:
an elongated truck or trailer body configured to be coupled with a truck or trailer cab, said truck or trailer body having a front with a vertical front panel behind the truck or trailer cab, a rear with a vertical rear panel, a first side with a vertical first side panel and a second side with a vertical second side panel, said second side panel having a surface for displaying a message;
a first panel connected at the front of the truck or trailer body at the second side panel, said first panel movable between a closed position wherein the first panel is folded over the second side panel and an opened position wherein the first panel extends outward from the second side panel and forward along said truck or trailer cab, said first panel having a surface for displaying a message;
a second panel connected at the rear of the truck or trailer body at the second side panel, said second panel movable between a closed position wherein the second panel is folded over the rear panel and an opened position wherein the second panel extends outward from the second side panel, said first panel having a surface for displaying a message; and
an upper support panel having a distal edge and a proximal edge connected at the upper edge of said opening, said upper support panel having a closed position wherein said lower support panel is substantially vertical and the distal edge is releasably locked to the second side panel, and an opened position wherein said upper support panel is substantially horizontal and extending substantially perpendicularly outward from said second side panel at the upper edge of said opening, and wherein said upper support panel having a first panel portion and a second panel portion rotatably connected to the first panel portion, the first panel portion and said second panel portion being substantially vertical and coplanar in the closed position and the first panel portion being rotated upward over the second panel portion in the opened position.

14. A mobile system comprising:
an elongated truck or trailer body configured to be coupled with a truck or trailer cab, said truck or trailer body having a front with a vertical front panel behind the truck or trailer cab, a rear with a vertical rear panel, a first side with a vertical first side panel and a second side with a vertical second side panel, said second side panel having a surface for displaying a message;
a first panel connected at the front of the truck or trailer body at the second side panel, said first panel movable between a closed position wherein the first panel is folded over the second side panel and an opened position wherein the first panel extends outward from the second side panel and forward along said truck or trailer cab, said first panel having a surface for displaying a message;
a second panel connected at the rear of the truck or trailer body at the second side panel, said second panel movable between a closed position wherein the second panel is folded over the rear panel and an opened position wherein the second panel extends outward from the second side panel, said first panel having a surface for displaying a message; and
a locking mechanism coupled to said second panel and configured to lock said second panel in the opened position, wherein the second panel opened position is between the second side panel and the rear panel such that the first panel is not against the second side panel and is not against the rear side panel.

15. A mobile system comprising:
an elongated truck or trailer body configured to be coupled with a truck or trailer cab, said truck or trailer body having a front with a vertical front panel behind the truck or trailer cab, a rear with a vertical rear panel, a first side with a vertical first side panel and a second side with a vertical second side panel, said second side panel having a surface for displaying a message;
a first panel connected at the front of the truck or trailer body at the second side panel, said first panel movable between a closed position wherein the first panel is folded over the second side panel and an opened position wherein the first panel extends outward from the second side panel and forward along said truck or trailer cab, said first panel having a surface for displaying a message;
a second panel connected at the rear of the truck or trailer body at the second side panel, said second panel movable between a closed position wherein the second panel is folded over the rear panel and an opened position wherein the second panel extends outward from the second side panel, said first panel having a surface for displaying a message, said second panel having a first panel portion and a second panel portion rotatably coupled to the first panel portion, said second panel portion folded onto the first panel portion in the closed position and extending outward from said first panel portion in the opened position.

\* \* \* \* \*